US010481255B2

(12) United States Patent
Prasad et al.

(10) Patent No.: US 10,481,255 B2
(45) Date of Patent: Nov. 19, 2019

(54) TRAILER DIMENSION ESTIMATION WITH TWO DIMENSIONAL RADAR AND CAMERA

(71) Applicant: APTIV TECHNOLOGIES LIMITED, St. Michael OT (BB)

(72) Inventors: Premchand Krishna Prasad, Carmel, IN (US); Robert J. Cashler, Kokomo, IN (US)

(73) Assignee: APTIV TECHNOLOGIES LIMITED (BB)

( * ) Notice: Subject to any disclaimer, the term of this patent is extended or adjusted under 35 U.S.C. 154(b) by 242 days.

(21) Appl. No.: 15/232,577

(22) Filed: Aug. 9, 2016

(65) Prior Publication Data

US 2018/0045823 A1   Feb. 15, 2018

(51) Int. Cl.

| | |
|---|---|
| *G01S 13/86* | (2006.01) |
| *G01S 7/41* | (2006.01) |
| *G01S 13/04* | (2006.01) |
| *G01S 13/42* | (2006.01) |
| *G01S 13/72* | (2006.01) |
| *G01S 13/87* | (2006.01) |
| *G01S 13/93* | (2006.01) |
| *H04N 7/18* | (2006.01) |
| *G01S 13/88* | (2006.01) |
| *G06K 9/00* | (2006.01) |

(52) U.S. Cl.
CPC ............ *G01S 13/867* (2013.01); *G01S 7/411* (2013.01); *G01S 13/04* (2013.01); *G01S 13/42* (2013.01); *G01S 13/72* (2013.01); *G01S 13/865* (2013.01); *G01S 13/878* (2013.01); *G01S 13/88* (2013.01); *G01S 13/931* (2013.01); *G06K 9/00805* (2013.01); *H04N 7/183* (2013.01); *G01S 2013/9332* (2013.01); *G01S 2013/9378* (2013.01)

(58) Field of Classification Search
CPC ........ G01S 13/04; G01S 13/42; G01S 13/867; G01S 7/411; G01S 13/72; G01S 13/865; G01S 13/878; G01S 13/931; G01S 2013/9332; G01S 2013/9378
USPC ............................................. 342/52
See application file for complete search history.

(56) References Cited

U.S. PATENT DOCUMENTS 9,211,889 B1    12/2015  Hoetzer et al.
2013/0027195 A1*  1/2013  Van Wiemeersch ........................
                                          B60W 30/12
                                              340/431

(Continued)

FOREIGN PATENT DOCUMENTS

DE   10 2014 107 917 A1   9/2015
GB   2 518 857 A          4/2015

*Primary Examiner* — Timothy X Pham
(74) *Attorney, Agent, or Firm* — Joseph V. Bonadies

(57) ABSTRACT

A trailer-detection system includes a radar-sensor, a camera, and a controller. The radar-sensor is used to determine a range, and an azimuth-angle, of a radar-signal reflected by a feature of trailer towed by a host-vehicle. The camera is used to capture an image of the trailer. The controller is in communication with the radar-sensor and the camera. The controller is configured to determine a position in the image of a viewable-feature of the trailer, determine a trailer-width and a trailer-height of the trailer based on the position and a range and azimuth-angle to the viewable-feature indicated by the radar-sensor, and optionally determine the trailer-length based on the range and azimuth-angle of the radar-signal reflected by a hidden-feature.

22 Claims, 3 Drawing Sheets

(56) References Cited

U.S. PATENT DOCUMENTS

| | | | |
|---|---|---|---|
| 2014/0160276 A1* | 6/2014 | Pliefke | B60R 1/00 |
| | | | 348/118 |
| 2014/0160279 A1 | 6/2014 | Pliefke et al. | |
| 2014/0176716 A1* | 6/2014 | Wallat | B62D 15/025 |
| | | | 348/148 |
| 2016/0041258 A1 | 2/2016 | Cashler et al. | |
| 2016/0101811 A1* | 4/2016 | Kyrtsos | B62D 13/06 |
| | | | 701/25 |
| 2016/0153778 A1 | 6/2016 | Singh et al. | |
| 2016/0297361 A1* | 10/2016 | Drazan | H04N 7/181 |
| 2017/0080928 A1* | 3/2017 | Wasiek | B60W 10/20 |
| 2018/0025499 A1* | 1/2018 | Strano | G06T 7/215 |
| | | | 340/431 |

\* cited by examiner

TRAILER DIMENSION ESTIMATION WITH TWO DIMENSIONAL RADAR AND CAMERA

TECHNICAL FIELD OF INVENTION

This disclosure generally relates to a trailer-detection system, and more particularly relates to a system that detects a trailer-presence and determines a dimension of a trailer.

BACKGROUND OF INVENTION

It is known to equip a host-vehicle with a trailer-detection system for detecting a presence and a dimension of a trailer towed by the host-vehicle. When the host-vehicle is towing the trailer, reflections of radar-signals from other objects not associated with the trailer (e.g. another vehicle in an adjoining lane) may interfere with the determination of the trailer dimension. The accurate determination of the trailer-size is essential for distinguishing the trailer from other targets for use in blind spot detection systems, lane departure warning systems, and other active-safety systems.

SUMMARY OF THE INVENTION

In accordance with one embodiment, a trailer-detection system configured to determine a dimension of a trailer towed by a host-vehicle is provided. The system includes a radar-sensor, a camera, and a controller. The radar-sensor is used to determine a range, and an azimuth-angle of a radar-signal reflected by a feature of a trailer towed by a host-vehicle. The camera is used to capture an image of the trailer. The controller is in communication with the radar-sensor and the camera. The controller is configured to determine a position in the image of a viewable-feature of the trailer. The controller is further configured to determine a trailer-width and a trailer-height of the trailer based on the position and a range and azimuth-angle to the viewable-feature indicated by the radar-sensor.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
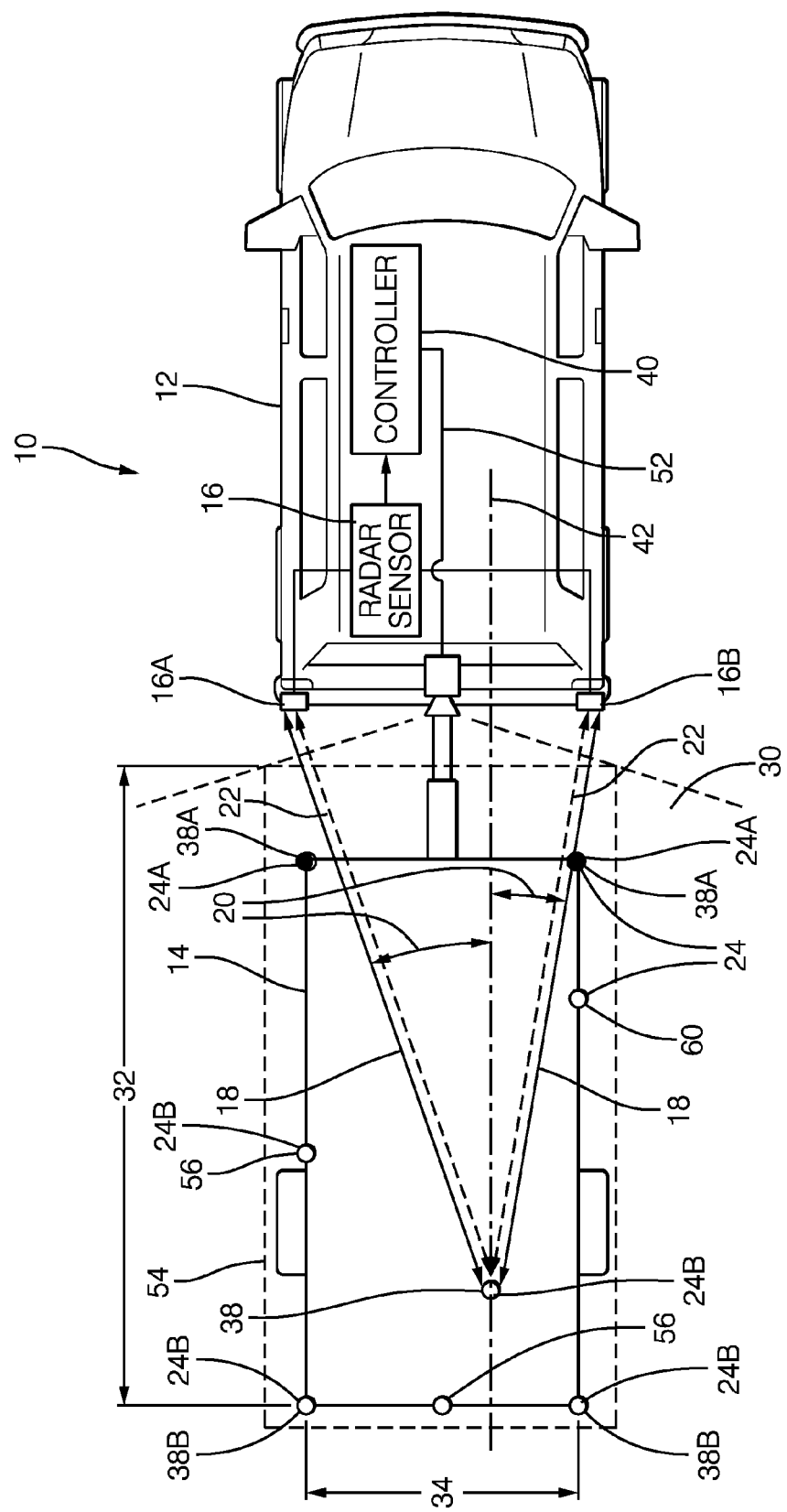
FIG. 1 is a top view of a host-vehicle equipped with a trailer-detection system and towing a trailer in accordance with one embodiment.
Figure 3:
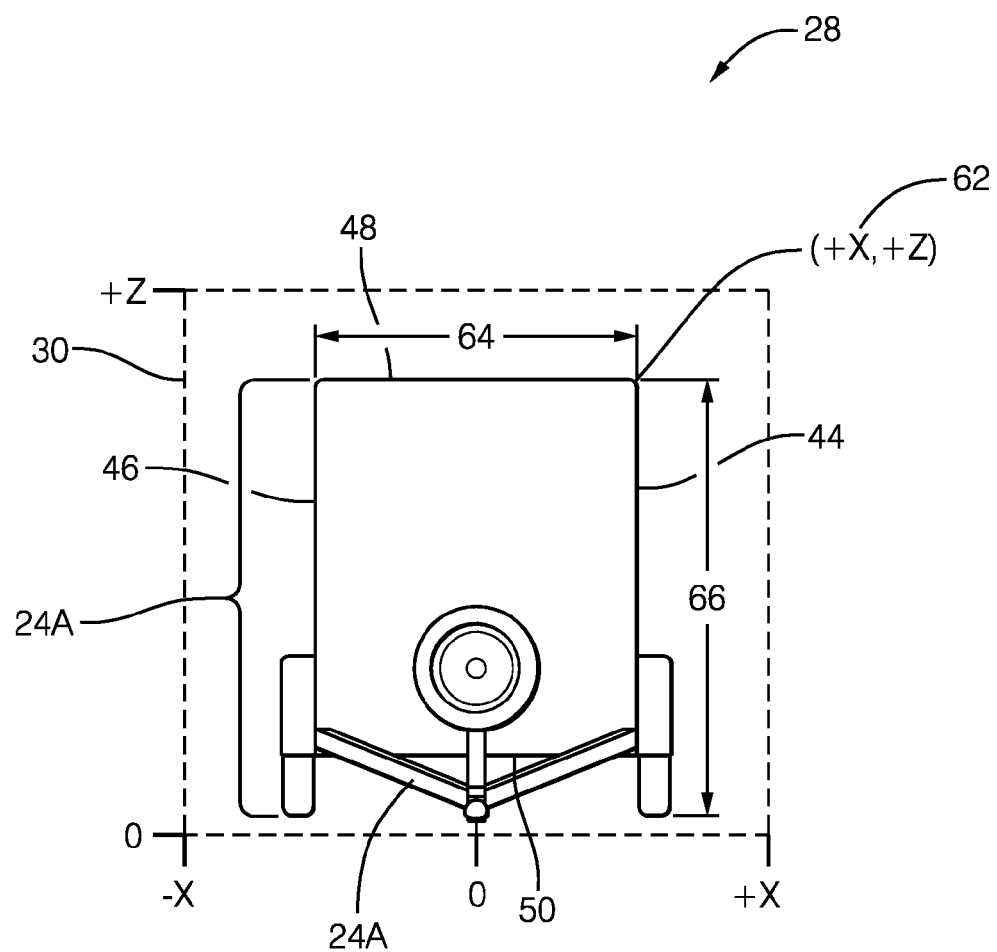
FIG. 3 is an illustration of an image in a field of a field-of-view of a camera that is part of the system of FIG. 1 in accordance with one embodiment.

FIG. 1 illustrates a non-limiting example of a trailer-detection system 10, hereafter referred to as the system 10. The system 10 is generally configured to detect objects proximate to a host-vehicle 12 equipped with the system 10. As will be described in more detail below, the system 10 is an improvement over prior trailer-detection systems because the system 10 is configured to more accurately determine a dimension (e.g. height, width, and/or length) of a trailer 14 being towed by the host-vehicle 12 by using a radar-sensor 16 to determine a range 18, and an azimuth-angle 20 of a radar-signal 22 reflected by a feature 24 of the trailer 14, and by using a camera 26 to capture an image 28 (FIG. 3) of the trailer 14 that is in a field-of-view 30 of the camera 26. This improvement enables the system 10 to more accurately determine a trailer-length 32, a trailer-width 34, and a trailer-height 36.

The system 10 includes the radar-sensor 16 used to detect the radar-signal 22 that is reflected by the features 24 of the trailer 14 towed by the host-vehicle 12. Typically, radar-systems on vehicles are capable of only determining a distance or range 18 and azimuth-angle 20 to a target so may be referred to as a two-dimensional (2D) radar-system. Other radar-systems are capable of determining an elevation-angle to a target so may be referred to as a three-dimensional (3D) radar-system. In the non-limiting example illustrated in FIG. 1, the 2D radar-sensor 16 includes a left-sensor 16A and a right-sensor 16B. It is contemplated that the teachings presented herein are applicable to both 2D radar-systems and 3-D radar-systems with one or more sensor devices, i.e. multiple instances of the radar-sensor 16. The radar-sensor 16 is generally configured to detect the radar-signal 22 that may include data indicative of a detected-target 38 present on the trailer 14. As used herein, the detected-target 38 present on the trailer may be a feature 24 of the trailer 14 that is detected by the radar-sensor 16 and tracked by a controller 40, as will be described below.

By way of example and not limitation, the radar-sensor 16 may be configured to output a continuous or periodic data stream that includes a variety of signal characteristics associated with each target detected. The signal characteristics may include or be indicative of, but are not limited to, the range 18 to the detected-target 38 from the host-vehicle 12, the azimuth-angle 20 to the detected-target 38 relative to a host-vehicle-longitudinal-axis 42, an amplitude (not shown) of the radar-signal 22, and a relative-velocity (not shown) of closure relative to the detected-target 38. A target is generally detected because the radar-signal 22 from the detected-target 38 has sufficient signal strength to meet some predetermined threshold. That is, there may be targets that reflect the radar-signal 22, but the strength of the radar-signal 22 is insufficient to be characterized as one of the detected-targets 38. Data that corresponds to a strong-target 38A will generally be from consistent, non-intermittent signals. However, data that corresponds to a weak-target 38B may be intermittent or have some substantial variability due to a low signal-to-noise ratio.

Figure 2:
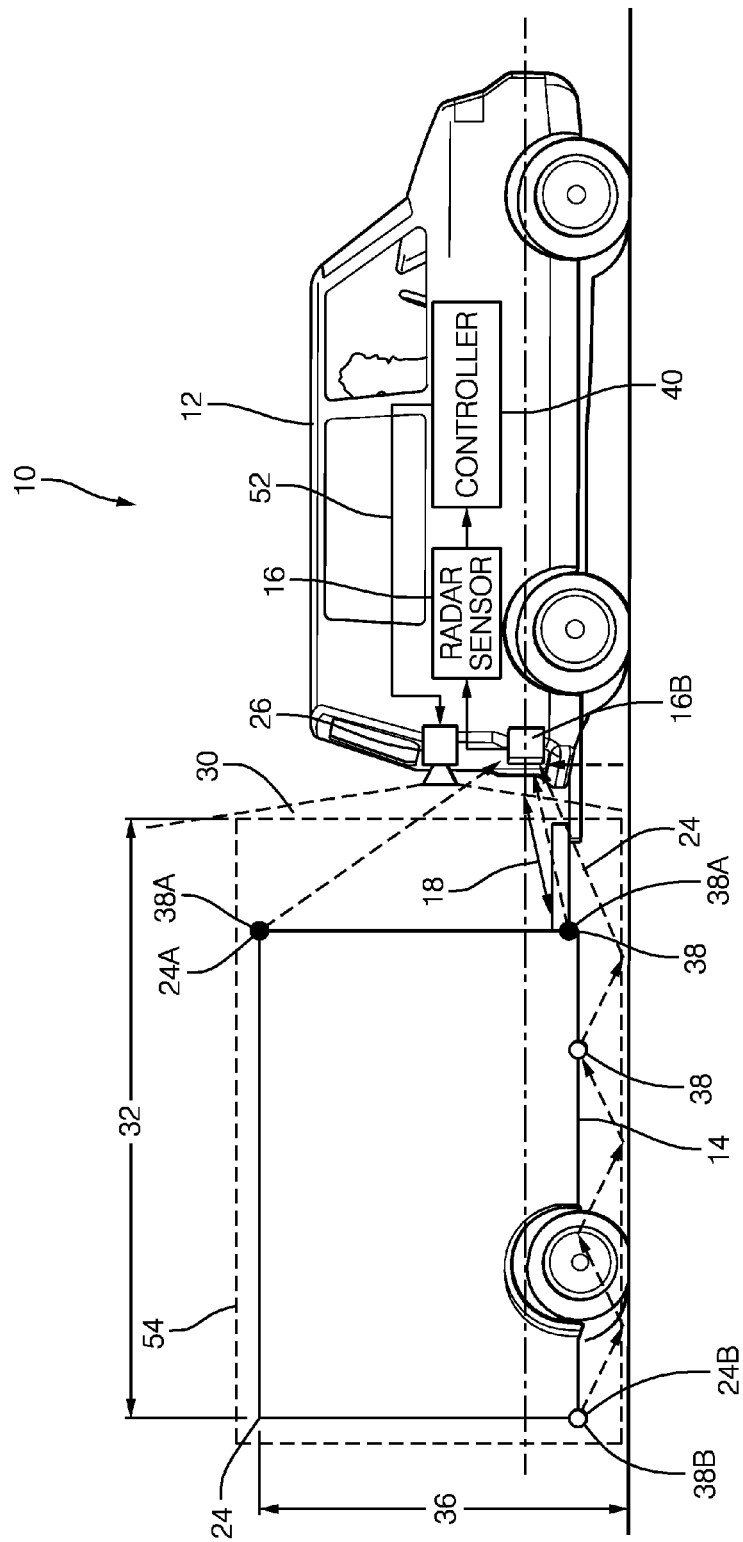
FIG. 2 is a side view of the host-vehicle of FIG. 1 equipped with a trailer-detection system and towing a trailer in accordance with one embodiment.

FIG. 2 is a right-side view of the system 10 of FIG. 1. When the trailer 14 is being towed, there will generally be some consistent reflected signals created from strong-targets 38A such as the front of the trailer or other highly reflective objects such as wheel wells or fenders of the trailer 14; and some intermittent reflected signals from weak-targets 38B such as the back bumper of the trailer 14 or other-vehicles (not shown) such as a motorcycle for example. Reflected signals from the weak-targets 38B may be, for example, a multi-path reflection from under the trailer 14 as the radar-signal 22 bounces between the trailer 14 and the ground, or by multi-path reflections traveling through a grated open trailer 14 or cross-frame members of the frame of the trailer 14. Data from the reflected signals of detected-targets 38 that exist above and below the horizontal-plane of the radar-sensor 16 are collapsed onto a 2D grid and may result in a determination of the trailer-length 32 and the trailer-width 34 that is greater than the actual value. This is due to the nature of the 2D radar-sensor's 16 inability to interpret the 3D radar-signal's 22 elevation-angle (not shown), as will be understood by one skilled in the art of radar interpretation.

The system 10 includes the camera 26 used to capture an image 28 (FIG. 3) of the trailer 14 that is in the field-of-view 30 of the camera 26. The camera 26 may be any camera-system suitable for use on a host-vehicle 12, such as a rear-view-camera that exists on many vehicles as a safety device. It is contemplated that the teachings presented herein are applicable to camera-systems with one or more devices, i.e. multiple instances of the camera 26. Other sensor-systems, such as LIDAR, may be used in place of a camera 26, for example. The feature 24 of the trailer 14 that is in the field-of-view 30 of the camera 26 is defined as a viewable-feature 24A, and the feature 24 of the trailer 14 that is not in the field-of-view 30 of the camera 26 is defined as a hidden-feature 24B. Examples of viewable-features 24A may include a left-vertical-edge 44 and a right-vertical-edge 46 of the front of the trailer 14, and a top-horizontal-edge 48 and a bottom-horizontal-edge 50 of the front of the trailer 14, for example. Examples of hidden-features 24B may include a left-corner and a right-corner of the rear of the trailer 14, and a bottom-horizontal-edge 50 of the rear of the trailer 14, for example. Viewable-features 24A may also correspond to strong-targets 38A as detected by the radar-sensor 16. As such, references to the term 'viewable-feature' in the discussion that follows are directly comparable to the term 'strong-target'. Hidden-features 24B may also correspond to weak-targets 38B as detected by the radar-sensor 16.

The system 10 includes the controller 40 in communication with the radar-sensor 16 and the camera 26. The controller 40 is configured to receive the radar-signal 22 from the radar-sensor 16 and to receive an image-signal 52 from the camera 26. The controller 40 may include a processor (not shown) such as a microprocessor or other control circuitry such as analog and/or digital control circuitry including an application specific integrated circuit (ASIC) for processing data as should be evident to those skilled in the art. The controller 40 may include a memory, including non-volatile memory, such as electrically erasable programmable read-only memory (EEPROM) for storing one or more routines, thresholds and captured data. The one or more routines may be executed by the processor to perform steps for determining if signals received by the controller 40 indicate the presence of objects as described herein.

The controller 40 is generally configured to determine if the radar-signal 22 arising from the detected-targets 38 corresponds to (i.e. is associated with) the trailer 14 being towed by the host-vehicle 12. That is, the controller 40 determines if the trailer 14 is present, so is actually being towed by the host-vehicle 12. The controller 40 is also generally configured to define a two-dimensional (2D) component of a trailer-boundary 54 characterized as occupied by the trailer 14 and thereby excluded from the zone proximate to the host-vehicle 12 where objects can be detected. By defining the portion of the zone proximate to the host-vehicle 12 that is the trailer-boundary 54, the controller 40 can more readily determine if what seems to be a new target indicated by the radar-signal 22 is likely from the trailer 14, or is likely from something other than the trailer 14, such as the other-vehicle (not shown).

The radar-signal 22 may be analyzed by the controller 40 to categorize the data from each detected-target 38 with respect to a list of previously detected-targets 38 having established tracks. As used herein, a track refers to one or more data sets that have been associated with a particular one of the detected-targets 38. By way of example and not limitation, if the amplitude of the radar-signal 22 is greater than a predetermined amplitude threshold, then the controller 40 determines if the data corresponds to a previously detected-target 38 or if a new-target has been detected. If the data corresponds to a previously detected-target 38, the data is added to or combined with prior data to update the track of the previously detected-target 38. If the data does not correspond to any previously detected-target 38 because, for example, it is located too far away from any previously detected-target 38, then it may be characterized as a new-target and assigned a unique track identification number. The identification number may be assigned according to the order that data for a new detected-target 38 is received, or may be assigned an identification number according to a grid location in the zone proximate to the host-vehicle 12.

The expectation is that a detected-target 38 or a track that corresponds to (i.e. is associated with) the trailer 14 would have a relative-velocity near zero, and that this condition would persist for an extended period of time. That is, the detected-target 38 corresponds to the trailer 14 if the range 18 to the detected-target 38 varies less than a variation threshold (e.g. less than 0.25 meters/Sec) for greater than a time threshold (e.g. greater than 5 seconds). It is noted that characterizing a target as having a relative-velocity near zero and having a variation in range 18 less than a variation threshold are effectively the same characterization. As such, references to the term 'range-rate' in the discussion that follows are directly comparable to the terms 'relative-velocity', 'relative-rate' and 'variation-in-range'.

Given the track data described above, each track is compared to a defined bounded area behind the host-vehicle 12 and only tracks that are within those bounds are used. The boundary is set by calibrations and the current boundary is 2.4 meters wide, 16.2 meters long, and 4.3 meters high. Additional constraints such as minimum amplitudes or detections sources may be applied to qualify a track prior to using it to determine the trailer-length 32 and the trailer-width 34. After the final track set is determined, the trailer-length 32 and the trailer-width 34 are determined in two steps: Determine the unfiltered (raw) value, and Filter the raw value to the final value. The unfiltered trailer-length 32 is determined by taking the maximum longitudinal-distance back from the rear bumper of the host-vehicle 12, and the raw trailer-width 34 is determined by taking the maximum lateral-distance between any two points within the bounded area. The unfiltered measures are then filtered. One way of filtering is to use a low pass filter with a long time constant such as five seconds. The second way of filtering is to create a histogram of the unfiltered measures where one count is added to the bin that corresponds to the current unfiltered measure and then the bin with the highest counts is selected as the filtered measure. The histogram filter approach appears to create a more stable estimation than the low pass filtered measure. By executing the processes described above, the trailer-length 32 of the trailer-boundary 54 can be determined by the controller 40 based on the longitudinal-distance to a most-distant-target 56 (FIG. 1) that corresponds to the trailer 14 and is closer to the host-vehicle 12 than a maximum trailer-length (16.2 meters) and the trailer-width 34 of the trailer-boundary 54 can be determined based on the lateral-distance between a left-most-target 58 that corresponds to the trailer 14, and a right-most-target 60 that corresponds to the trailer 14 (FIG. 1).

The controller 40 is also generally configured to determine a position 62 in the image 28 of viewable-features 24A of the trailer 14 based on the image-signal 52 using known image-analysis techniques. The position 62 of the viewable-features 24A relative to the field-of-view 30 of the camera 26 may be used to estimate a lateral-dimension 64 between the left-vertical-edge 44 and the right-vertical-edge 46 of the front of the trailer 14. The radar-signal 22 may be used to determine the distance between the host-vehicle and a vertical-plane in which the left-vertical-edge 44 and the right-vertical-edge 46 of the front of the trailer 14 lay to establish a dimensional reference for the estimation of the lateral-dimension 64, as will be recognized by one skilled in the art of geometry. The position 62 of the viewable-features 24A relative to the field-of-view 30 of the camera 26 may also be used to estimate a vertical-dimension 66 between the top-horizontal-edge 48 and the bottom-horizontal-edge 50 of the front of the trailer 14. The radar-signal 22 may also be used to determine the distance between the host-vehicle 12 and a vertical-plane in which the top-horizontal-edge 48 and the bottom-horizontal-edge 50 of the front of the trailer 14 lay to establish a dimensional reference for the estimation of the vertical-dimension 66, as will be recognized by one skilled in the art of geometry. The lateral-dimension 64 that is estimated by the controller 40 may be applied as a constraint to qualify a track prior to using it to determine the trailer-width 34, as any tracks detected beyond the bounds of the lateral-dimension 64 are determined not to be associated with the trailer 14. The vertical-dimension 66 that is estimated by the controller 40 may be used to determine the trailer-height 36 relative to the ground through geometric calculation by applying the known vertical-distance between the longitudinal-axis of the camera 26 and the ground, as will be understood by one skilled in the art of geometry. By combining the trailer-height 36, the trailer-width 34, and the trailer-length 32, a 3D component of the trailer-boundary 54 may be established by the controller 40.

Accordingly, a trailer-detection system 10 (the system 10) and a controller 40 for the system 10 is provided. The teachings presented herein advantageously improve the determination of the dimensions of the trailer 14 over prior trailer-detection systems.

While this invention has been described in terms of the preferred embodiments thereof, it is not intended to be so limited, but rather only to the extent set forth in the claims that follow.

We claim:

1. A trailer-detection system configured to determine a dimension of a trailer towed by a host-vehicle, said system comprising:
    a radar-sensor used to determine a range and an azimuth-angle of a radar-signal reflected by a feature of a trailer towed by a host-vehicle;
    a camera used to capture an image of the trailer towed by the host-vehicle; and
    a controller in communication with the radar-sensor and the camera, said controller configured to:
        determine a position in the image of at least a first viewable-feature and a second viewable-feature of a front of the trailer towed by the host-vehicle; wherein the first viewable-feature comprises a top-horizontal-edge of the front of the trailer and the second viewable-feature comprises a bottom-horizontal-edge of the front of the trailer; and
        determine a trailer-height of the trailer based on the position and a range and azimuth-angle to the first viewable-feature and the second viewable-feature indicated by the radar-sensor.

2. The system in accordance with claim 1, wherein the controller is further configured to determine the trailer-length based on the range and azimuth-angle of the radar-signal reflected by a hidden-feature.

3. The system in accordance with claim 2, wherein the hidden-feature includes a left-corner of a rear of the trailer.

4. The system in accordance with claim 2, wherein the viewable-feature includes a right-corner of a rear of the trailer.

5. The system in accordance with claim 2, wherein the viewable-feature includes a bottom-horizontal-edge of a rear of the trailer.

6. The system in accordance with claim 1, wherein the trailer-length is further determined based on the range and azimuth-angle of the viewable-feature.

7. The system in accordance with claim 1, wherein the radar-sensor comprises a left-sensor and a right-sensor.

8. The system in accordance with claim 1, wherein the left-sensor and the right-sensor are located at rear corners of the host-vehicle.

9. The system in accordance with claim 1, wherein the controller is further configured to:
    determine a position in the image of at least a third viewable-feature and a fourth viewable-feature of a front of the trailer towed by the host-vehicle; wherein the third viewable-feature comprises a left-vertical-edge of the front of the trailer and the fourth viewable-feature comprises a right-vertical-edge of the front of the trailer; and
    determine a trailer-width of the trailer based on the position and a range and azimuth-angle to the third viewable-feature and the fourth viewable-feature indicated by the radar-sensor.

10. The system in accordance with claim 9, wherein the trailer-width is a width of the front of the trailer.

11. The system in accordance with claim 1, wherein the trailer-height is a height of the front of the trailer.

12. A trailer-detection method configured to determine a dimension of a trailer towed by a host-vehicle, said method comprising:
    determining, with a radar-sensor, a range and an azimuth-angle of a radar-signal reflected by a feature of a trailer towed by a host-vehicle;
    capturing an image of the trailer towed by the host-vehicle with a camera;
    determining, with a controller in communication with the radar-sensor and the camera, a position in the image of at least a first viewable-feature and a second viewable-feature of a front of the trailer towed by the host-vehicle; wherein the first viewable-feature comprises a top-horizontal-edge of the front of the trailer and the second viewable-feature comprises a bottom-horizontal-edge of the front of the trailer; and
    determining, with the controller, a trailer-height of the trailer based on the position, a range, and azimuth-angle to the first viewable-feature and the second viewable-feature indicated by the radar-sensor.

13. The method in accordance with claim 12, wherein the controller is further configured to determine the trailer-length based on the range and the azimuth-angle of the radar-signal reflected by a hidden-feature.

14. The method in accordance with claim 13, wherein the hidden-feature includes a left-corner of a rear of the trailer.

15. The method in accordance with claim 13, wherein the hidden-feature includes a right-corner of a rear of the trailer.

16. The method in accordance with claim 13, wherein the hidden-feature includes a bottom-horizontal-edge of a rear of the trailer.

17. The method in accordance with claim 12, wherein the trailer-length is further determined based on the range and the azimuth-angle of the viewable-feature.

18. The method in accordance with claim 12, wherein the radar-sensor comprises a left-sensor and a right-sensor.

19. The method in accordance with claim 12, wherein the left-sensor and the right-sensor are located at rear corners of the host-vehicle.

20. The method in accordance with claim 12, wherein the controller is further configured to:
   determine a position in the image of at least a third viewable-feature and a fourth viewable-feature of a front of the trailer towed by the host-vehicle; wherein the third viewable-feature comprises a left-vertical-edge of the front of the trailer and the fourth viewable-feature comprises a right-vertical-edge of the front of the front of the trailer; and
   determine a trailer-width of the trailer based on the position and a range and azimuth-angle to the third viewable-feature and the fourth viewable-feature indicated by the radar-sensor.

21. The method in accordance with claim 20, wherein the trailer-width is a width of the front of the trailer.

22. The method in accordance with claim 12, wherein the trailer-height is a height of the front of the trailer.

\* \* \* \* \*